March 17, 1925.  1,529,996
H. N. GRESLEY
BEARING
Filed Nov. 23, 1921  2 Sheets-Sheet 1
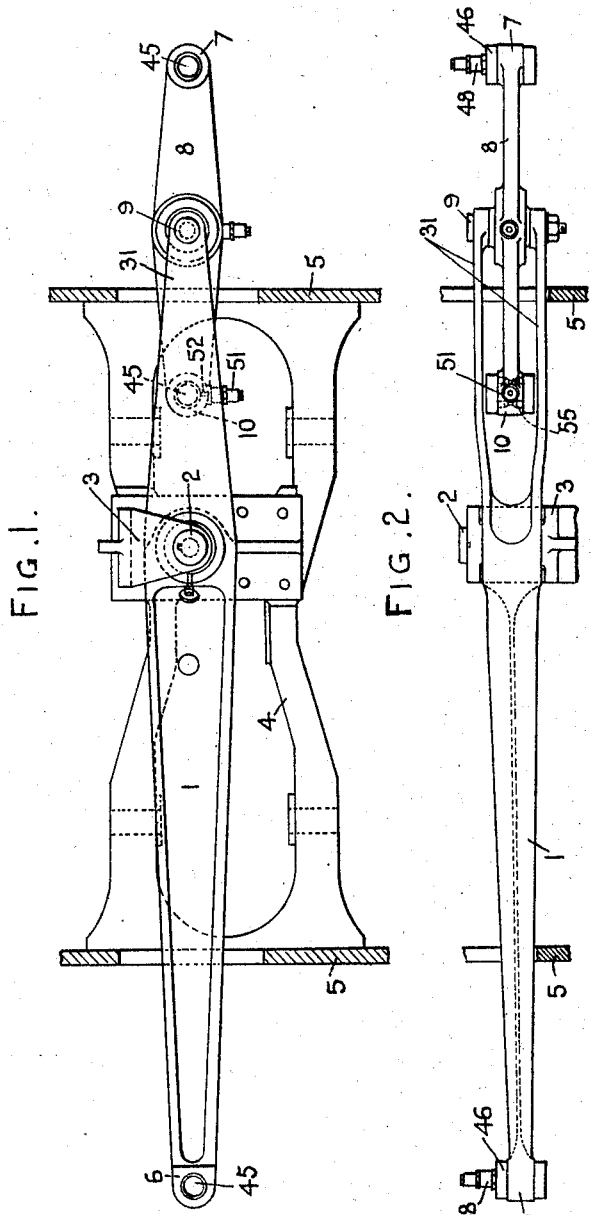

March 17, 1925.

H. N. GRESLEY

BEARING

Filed Nov. 23, 1921

Inventor
Herbert N. Gresley
by Herbert W. Henner
Attorney.

Patented Mar. 17, 1925.

1,529,996

UNITED STATES PATENT OFFICE.

HERBERT NIGEL GRESLEY, OF DONCASTER, ENGLAND, ASSIGNOR TO AMERICAN LOCOMOTIVE COMPANY, OF NEW YORK, N. Y., A CORPORATION OF NEW YORK.

BEARING.

Application filed November 23, 1921. Serial No. 517,343.

*To all whom it may concern:*

Be it known that I, HERBERT NIGEL GRESLEY, a subject of the King of Great Britain and Ireland, residing at Doncaster, England, whose post-office address is Avenue House, Doncaster, in the county of York, England, have invented certain new and useful Improvements in Bearings; and I do hereby declare the following to be a full, clear, and exact description of the invention, such as will enable others skilled in the art to which it appertains to make and use the same.

This invention relates to valve gear for locomotive or other reversible steam engines having three cylinders the piston rods of which are connected with cranks set at suitable angles to each other, of the kind in which the valve of the intermediate cylinder is actuated through lever mechanism by or from the valves of the two outer cylinders without the employment of an independent or separate valve gear for the valve of the intermediate cylinder.

Particularly the invention relates to valve gear of the said type in which there is combined with the distribution valves of the outer cylinders and the valve gears of these valves, a pivoted lever working about a fixed point on the engine frame and having a longer and shorter arm, the longer arm being operatively connected at its end to the valve spindle of one of the outer cylinders, and a floating lever or sway beam connected at its ends to the valve spindle of the other outer cylinder and to the valve spindle of the intermediate or central cylinder respectively, said floating lever or sway beam being pivotally connected midway of the ends thereof to the shorter arm of the other lever whereby the necessary movements are given to the valve of the intermediate or central cylinder by the movements of the valves and valve gears of the outer cylinders.

It will be appreciated that with valve gear of this type any slight interference with the axis of the pivoted lever or with the axis of the sway-beam is seriously amplified at the ends of the levers so as to affect the desired operation of the valves.

It is found that however good a fit is provided for the pivoted lever on its pivot pin the wear that takes place after running for even a comparatively short period is detrimental to the efficient working of the apparatus.

The object of the present invention is to provide bearings for the pivoted lever and for the sway-beam or small motion lever such that the adjustment is not distributed during prolonged working of the gear.

For this purpose according to the invention the pivoted or large motion lever has interposed between its fulcrum or pivot pin a combination of roller and ball bearings so constructed and arranged as to avoid play without giving rise to undesirable friction, the said roller and ball bearings being located in a lubricant chamber which is rendered lubricant tight in any appropriate manner.

In like manner there is interposed between the sway-beam or small motion lever and its fulcrum or pivot pin a combination of roller and ball bearings that prevent play without undue friction and that are located in a lubricant chamber suitable packed to prevent the escape of lubricant.

The arrangement in each case is such that the weight of the lever is taken by the ball bearings located between the roller bearings about which the lever can freely rock without play or undesirable friction.

In the accompanying drawings:—

Fig. 1 shows in plan so much of valve gear embodying the invention as is necessary to illustrate the same.

Fig. 2 shows the large motion and small motion levers in elevation.

Figure 3:
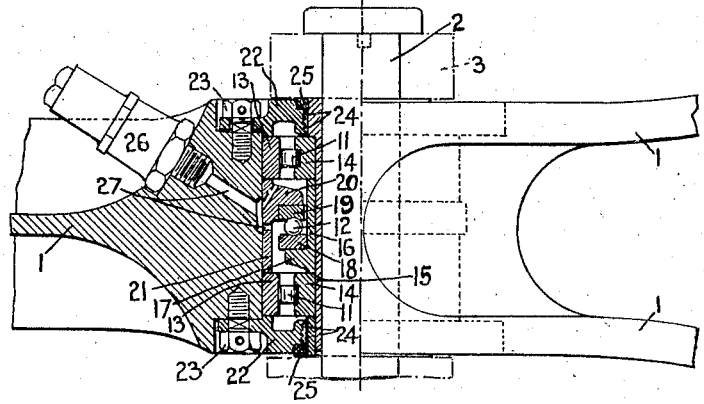
Fig. 3 shows to a larger scale the fulcrum arrangement for the large motion lever partly in central vertical section and partly in elevation.
Figure 4:
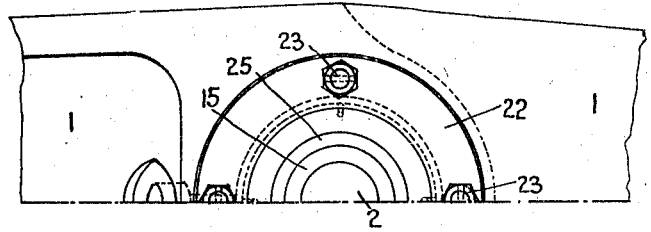
Fig. 4 is a half plan of the parts shewn in Fig. 3.

1 indicates the large motion lever mounted to rock on a fulcrum pin 2 which is carried in a bracket 3 fixed to a transverse member 4 of the underframe 5 of the engine. One end 6 of the large motion lever 1 is connected to the valve of one of the outside cylinders. The valve of the other outside cylinder is connected to one end 7 of the small motion lever 8 which is pivoted at 9, midway of its length, to the other end of the large motion lever 1; the opposite end of the small motion lever 8 being connected at 10 to the valve of the intermediate or central cylinder.

Interposed between the fulcrum or pivot pin 2 and the pivot boss of the large motion lever 1 are roller bearings 11 located above and below a ball bearing 12, see Fig. 3. The outer races 13 of the roller bearings 11 tightly fit the bearing boss of the large motion lever 1 and the inner races 14 of such bearings tightly fit a sleeve 15 which is fitted on the fulcrum pin 2. Between the inner races 14 a shorter sleeve 16 is fitted on the sleeve 15 and the lower end of the sleeve 16 is provided with an outwardly extending flange 17 that forms a seat for the lower race 18 of the ball bearing 12 the upper race 19 of which is seated on an inwardly extending flange 20 formed in one with a sleeve 21 tightly fitting the boring of the boss of the large motion lever 1 and located between the outer races 13 of the roller bearings.

The boring of the boss of the large motion lever 1 is closed at each end by an annular cap 22 secured in place by suitable studs and nuts 23 so as to provide a lubricant chamber within which the several bearings are located. To prevent the escape of lubricant from such chamber the inner peripheries of the cap rings 22 are formed with sealing grooves 24 and fitted with packing rings 25 of thick felt or the like adapted to bear upon the sleeve 15 or a part secured thereto. Lubricant is delivered to such chamber from a lubricant cup 26 screwed into the boss of the large motion lever and in communication with the ball and roller bearings through passages 27 formed in the lever boss and in the sleeve 21.

Figure 5:
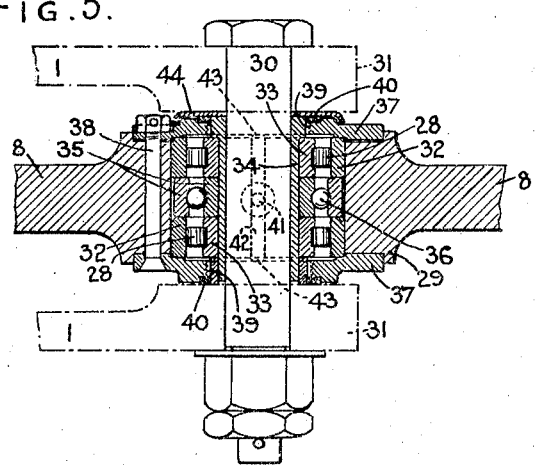
Fig. 5 is a similar view to Fig. 3 shewing the fulcrum arrangement of the small motion lever.
Figure 6:
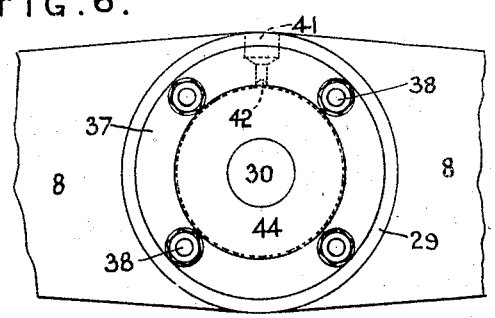
Fig. 6 is a plan of the parts shewn in Fig. 5.

The bearing for the small motion lever, see Figs. 5 and 6, comprises roller bearings 28 interposed between the boss 29 of the small motion lever 8 and the fulcrum pin 30 which is mounted in the bifurcated end 31 of the large motion lever. The outer races 32 of the roller bearings 28 tightly fit within the boring of the boss 29 and the inner races 33 tightly fit a sleeve 34 mounted on the pin 30. Endways movement of these races is prevented by the inner and outer races 35 of a ball bearing 36 that takes the weight of the small lever 8 and is located between the upper and lower roller bearings 28. Cap rings 37, fixed by bolts and nuts 38 to the top and bottom of the boss 29, bear against the outer and lower faces of the outer races and extend over the boring of the boss so as to form a closed lubricant chamber in which the roller bearings work. In like manner to the cap rings 22 of the bearing for the large motion lever the cap rings 37 are formed with sealing grooves 39 and fitted with packing rings 40 of felt or other material that bear against the sleeve 34 or parts secured thereto. Lubricant is delivered to the said lubricant chamber from an appropriate lubricant cup at 41 screwed into the boss 29 and communicated with the lubricant chamber through a longitudinal groove 42 formed in the lever boss and transverse grooves 43 formed in the end caps 37. 44 is a cover ring located between the top of the sleeve 34 and the underface of the top limb of the bifurcated end 31 of the large motion lever.

Figure 7:
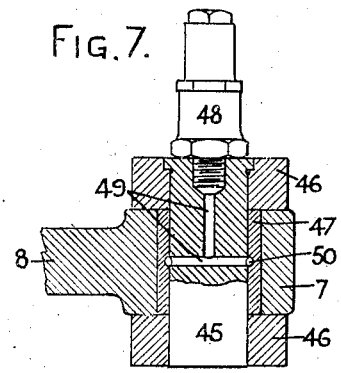
Fig. 7 is a sectional elevation shewing the connections of the valve operating links to the ends of the respective levers.
Figure 8:
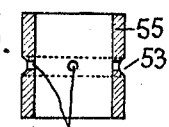
Fig. 8 is a detail view to which reference will be hereinafter made.

The pivot pins 45 whereby the one end 6 of the large motion lever and the two ends 7 and 10 of the small motion lever are connected to the links 46 that operate the valves proper, work in mild steel bushes 47, see Fig. 7, that tightly fit the ends of the respective levers, lubricant being supplied to the working surfaces from a vertically arranged lubricant cup 48 in the case of the connections to the outside cylinder valve gears, the lubricant passing from said cup through appropriate passages 49 formed in the pin and an internal groove 50 formed in the sleeve 47. In the case of the pivot pin 45 connecting the valve mechanism of the intermediate cylinder to the end 10 of the small motion lever, a lubricant cup 51 is arranged horizontally and delivers lubricant to the bearing surfaces through a passage 52 formed in the boss of the small motion lever and an external groove 53 and holes 54 formed in a sleeve 55 that is fitted on the pivot pin, see Fig. 8 which shows the sleeve 55 in section.

It will be understood that the invention is not limited to the precise details of construction illustrated as variations in such construction can be made without departure from the invention, for example the races 35 of the ball bearing 36 of the smaller lever 8 may in some cases be arranged horizontally in a similar way to the ball races 18 and 19 of the ball bearing 12 of the larger lever 1.

What I claim as my invention and desire to secure by Letters Patent is:—

The combination, with a stationary vertical pivot, of vertical upper and lower race members secured upon the said pivot, an inner sleeve secured on the said pivot between the said race members and provided with an outwardly projecting flange, a rocking lever mounted concentric with the said pivot, vertical upper and lower race members secured in the hub of the rocking lever and arranged opposite the aforesaid race members, antifriction devices arranged between the opposed race members, an outer sleeve secured in the said hub between its said race members and provided with an inwardly projecting flange which overlaps the said outwardly projecting flange, opposed horizontal race members secured upon the inner and outer sleeve respectively and bearing against their flanges, and antifriction devices operating to support the weight of the lever and arranged between the said horizontal race members.

In testimony whereof I affix my signature.

HERBERT NIGEL GRESLEY.